JAMES S. BALDWIN.
Improvement in Engines operated by Heated Liquids.
No. 121,480. Patented Dec. 5, 1871.
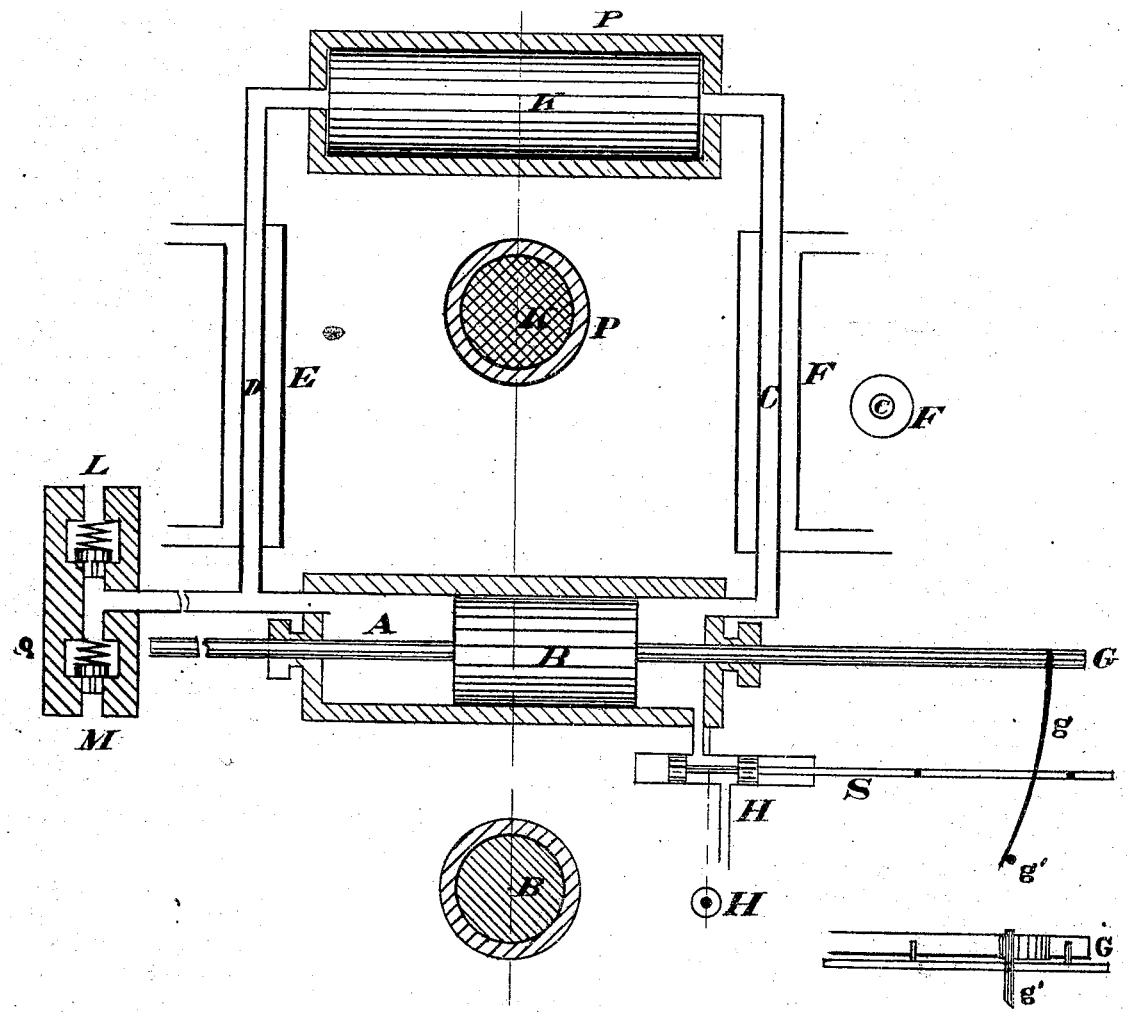

*Reissued Apl. 16th 1872.*

121,480

UNITED STATES PATENT OFFICE.

JAMES S. BALDWIN, OF NEWARK, NEW JERSEY.

IMPROVEMENT IN ENGINES OPERATED BY HEATED LIQUIDS.

Specification forming part of Letters Patent No. 121,480, dated December 5, 1871.

*To all whom it may concern:*

Be it known that I, JAMES S. BALDWIN, of Newark, in the county of Essex and State of New Jersey, have invented an Improved Apparatus for Controlling the Temperature of Liquids for the Production of Power, of which the following is a specification:

My invention consists in the hereinafter-described means employed to bring successive portions of any suitable liquid in contact with either a hot or cold surface, preferably metallic, or the two alternately, in such a manner that the expansion of said liquid by heat can only take place through a specific channel.

There are many liquids that may be used in this machine; but I shall refer to oil as a representative liquid, as I have obtained very good results from the use of a vegetable oil.

In the drawing, A is a cylinder containing the oil. B is a piston actuated by the rod G, which receives a regular reciprocating motion from any suitable source. C and G are tubes, surrounded by the jackets E and F. P is a cylinder filled with a mass of wire-gauze, K.

There are two ways by which the machine may be operated to alternately heat and cool its own contents, or to constantly receive and heat fresh volumes of oil. In the former case D is surrounded by cold water constantly flowing through its jacket E, and C is kept hot by a constant stream of exhaust steam from an engine, or by any other cheap heating medium. If now the piston is moved from left to right the oil will, if already hot, pass through C unchanged, then through K, and, being cooled in D, will re-enter A, filling the space behind the piston with cold oil. The motion of B being now reversed, the cold oil will pass through D unchanged, but will receive a considerable portion of its heat from K, and being heated in C will re-enter A hot. The wire-gauze will thenceforth assist both in heating and cooling the oil. During the heating operation the oil will expand with great force from one-twelfth to one-twentieth of its original bulk, according to the range of temperature employed, 212° Fahrenheit being assumed as the maximum. The overflow resulting from this expansion takes place through a check-valve in the block E and passes through a pipe attached to L to any desired point of application, such as a hydraulic press or engine. When cooled the oil undergoes a similar contraction, and the vacancy thus occasioned is supplied by a pipe attached at M, and connected with any suitable reservoir of cold oil. When the apparatus is employed to heat successive volumes of oil, A being filled with fresh oil and emptied at every stroke, the piston-valve H is brought into play. It is apparent that if H is opened, as in the drawing, the hot oil will be expelled through it, the friction of the wire-gauze preventing any considerable flow through itself, and cold oil will enter through M and fill the space behind B. When the stroke of B is completed the spring-bar $g$ will slip by the stud $g'$, and striking on a pin in S close H. B, now returning, will force the oil through C and D, both of which will be surrounded by steam in this case. K will prove useful in mixing the hot portions of the oil with those less perfectly heated during the flow through, as I have found that the film of oil in immediate contact with a tube becomes more highly heated than the central portion. For this reason a step-by-step motion is better for B than a continuous stroke, for then convection can take place to a certain extent in C and D. When the first method is employed $g$ should be removed from G, and H permanently shut. The fitting up, materials, and frame-work of the machine should be the same that are usually employed in the construction of good hydraulic machinery for high pressure.

I claim—

The arrangement and combination of cylinder A having piston B, cylinder P with wire-gauze K, tubes C and D, and valve-chest Q with valves, as an apparatus for controlling the temperature of liquids, substantially as set forth.

JAMES S. BALDWIN.

Witnesses:
 JOHN A. HEATH,
 C. H. GARABRANT.

(2)